Figure 1:
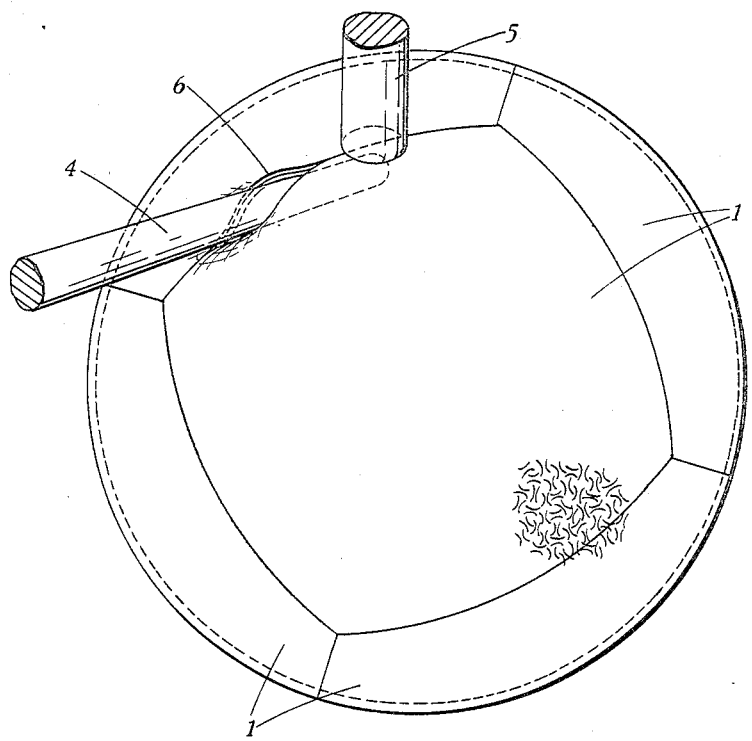

Oct. 31, 1939. F. C. DALMAU 2,178,528

PROCESS OF PRODUCING RUBBER BALLS

Filed March 11, 1937

INVENTOR
F. C. DALMAU.
BY
ATTORNEY

Patented Oct. 31, 1939

2,178,528

UNITED STATES PATENT OFFICE 2,178,528

PROCESS OF PRODUCING RUBBER BALLS

Francisco Capella Dalmau, Barcelona, Spain

Application March 11, 1937, Serial No. 130,362
In France March 12, 1936

3 Claims. (Cl. 18—56)

This invention relates to a method of manufacturing rubber balls.

One object of the present invention is to produce a rubber ball which, although formed from several pieces, has a uniform wall thickness. Another object of the present invention is to produce a coloured ball in which the colouring matter is incorporated in the body of the rubber and is not applied to the surface of the ball by dipping or painting processes. A further object of the present invention is to produce a rubber ball from rubber sheet of thickness less than that of the sheets which it is necessary to use in prior processes. Yet a further object of the present invention is to produce a rubber ball which can be inflated and deflated as required and having walls sufficiently thin to enable the ball to be readily packed away in a small space when deflated, thereby economising space and packing materials. Further objects of the present invention will appear as the description proceeds.

In its broadest form the invention comprises the step of forming a rubber ball from a number of pieces of raw rubber sheet which are caused to adhere to each other by their edges. It is found that good adherence is obtained by this method provided that the raw rubber is not too highly loaded. The two pieces may be joined by placing their edges in contact and then tapping along the line of contact either by hand or preferably by means of a machine of known type made with two arms one of which is fixed and the other in rapid vibration. The two pieces to be joined are placed between the extremities of these arms and adjusted to receive a series of shocks along the line of contact, whereby a butt joint is formed.

The pieces of raw rubber after they have been united in this way preferably form a body which on inflation under a pressure insufficient to lead to any reduction in the wall thickness of the pieces is a sphere of approximately the diameter desired for the final ball. In this way, dilatation before or during vulcanisation, issued in prior processes and leading to irregularities in wall thickness, is avoided. The body formed by uniting the various pieces of sheet rubber is inflated preferably without dilatation and placed in a spherical mould in which it is hot vulcanised. In this way balls of perfectly uniform wall thickness are obtained.

The process is particularly applicable to the production of multi-coloured balls starting from rubber sheets of different colours. The immersion or painting processes of the prior art are avoided and the colours are permanent and extend throughout the mass of the rubber. Balls having any desired variation of colouring may be produced in this way from appropriately coloured rubber sheets. In order to avoid the use of too much colouring matter, sheets which have been laminated or lined on a calander may be used, so that the inner surface of the ball may be of a single colour for example, grey, while the exterior surface remains multi-coloured. The use of lined sheets in this case has several advantages, because as stated above the quantity of colouring material necessary is reduced and also because the interior lining may be of material imparting special qualities, for example air-tightness to prevent escape of gas from the interior to the ball.

A great advantage of the present process is that the ball may be made from thin sheets and in consequence the weight of a ball of a given size may be as much as 50% less than the weight of balls obtained by the prior processes. Balls having thin walls may also be readily deflated and may subsequently be inflated by means of a valve. This is of considerable importance in the case of balloons or large balls because they can be stored and transported in the deflated state and simply inflated when required for use.

Vulcanisation is carried out in spherical moulds of known type and the necessary internal pressure is obtained by inflating the ball before placing it in the mould to a size approximately equal to the size required. If desired the internal pressure can be increased by means of chemical compounds which decompose on heating.

Figure 2:
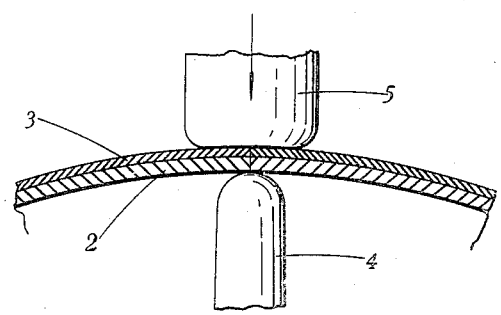

In order that a clearer perception of the present invention may be had, drawings, illustrating diagrammatically one form of apparatus whereby the method may be carried out, are presented. In these drawings, Figure 1 shows a ball in the course of manufacture and Figure 2 is an enlarged detail view showing the manner in which the butt joint is made. The ball consists preferably of a number of pieces 1, all cut from, for example, previously formed partspheres. Such partspheres, it will readily be understood, can easily be made of uniform wall thickness by any conventional process in a mould, and they are made from two layers 2 and 3, the inner layer 2 consisting of uncoloured rubber and the outer layer 3 of coloured rubber. The different pieces 1 have differently coloured outer layers 3, and they are assembled by hand with their edges making a butt joint, as shown in Figure 2. The next step consists in autogenously uniting the edges by hammering. A purely diagrammatic arrangement is illustrated in the figures, where an anvil 4 is used to support the joint and shocks are administered by a hammer 5. During most of the operation by making a ball it is easy to support the joint, but just before the last seam is closed the anvil must project through a small unclosed gap 6 only and finally must be withdrawn through this gap, which is then closed by hand.

In carrying out the above process, it will be understood that in order to obtain a satisfactory joint by the method described above, it is necessary to use a fairly high grade rubber containing not more than 50% of non-rubber substance. When a high grade rubber is used, a perfectly sharp and firm joint is obtained. This is a matter of considerable importance when the constituent pieces of the ball are of different colours.

I claim:

1. In a process for the production of a coloured rubber ball the steps which comprise assembling into a hollow body adapted to have an approximately spherical shape on inflation a plurality of separate pieces of raw sheet rubber whose rubber content exceeds 50% and which are of different colours uniting said pieces in butt-joint fashion at their edges subjecting the butt contacting edges to a rapid vibrating tapping action between a hammer and anvil, inflating the body thus obtained and vulcanising in the hot while maintaining the body externally spherical.

2. A process of producing hollow rubber articles which consists in the steps of assembling into a hollow body a plurality of separate pieces of raw sheet rubber, bringing the edges of said pieces together into butt contact, subjecting the contacting edges to rapid vibration between hammer and anvil to weld the edges together without thinning and subsequently vulcanizing the raw rubber.

3. A process according to claim 2, in which the hollow body produced is substantially spherical and includes the step of inflating the body prior to and while being vulcanized.

FRANCISCO CAPELLA DALMAU.